United States Patent [19]

Shumway

[11] Patent Number: 4,646,288
[45] Date of Patent: Feb. 24, 1987

[54] MULTI-LINE ACCUMULATOR/MULTIPLEXER

[75] Inventor: Jerry L. Shumway, Rockville, Md.

[73] Assignee: Denro Laboratories, Inc., Gaithersburg, Md.

[21] Appl. No.: 696,838

[22] Filed: Jan. 31, 1985

[51] Int. Cl.$^4$ ........................................... H04Q 11/04
[52] U.S. Cl. ...................................... 370/62; 370/68; 379/202
[58] Field of Search ....................... 370/62, 66, 67, 68, 370/5; 179/18 BC

[56] References Cited

U.S. PATENT DOCUMENTS

| | | | |
|---|---|---|---|
| 3,978,290 | 8/1976 | Sarma | 179/15 AT |
| 4,119,807 | 10/1978 | Nahay | 179/18 BC |
| 4,190,742 | 2/1980 | Southard | 179/18 BC |
| 4,225,956 | 9/1980 | Betts et al. | 370/62 |
| 4,229,814 | 10/1980 | Betts | 370/62 |
| 4,267,592 | 5/1981 | Craiglow | 370/29 |
| 4,289,932 | 9/1981 | Reed | 179/18 BC |
| 4,359,603 | 11/1982 | Heaton | 179/1 CN |
| 4,382,295 | 5/1983 | Moffitt et al. | 370/62 |
| 4,432,089 | 2/1984 | Wurzburg et al. | 370/110.1 |
| 4,477,897 | 10/1984 | Lane | 370/62 |
| 4,545,050 | 10/1985 | van Baardewijk et al. | 370/62 |

OTHER PUBLICATIONS

National Semiconductor, "TP3051, TP3056 Monolithic Parallel Data Interface CMOS CODEC/FILTER Family" (1984).

National Semiconductor, "TP3110, TP3120 Digital Line Interface Controllers (DLIC)-General Description" (1984).

Johnson, "An Inside Look at the New ROLM CBX II Architecture" (Jan.-Feb. 1984).

Primary Examiner—Douglas W. Olms
Assistant Examiner—Wellington Chin
Attorney, Agent, or Firm—Joseph G. Seeber

[57] ABSTRACT

A multi-line accumulator/multiplexer for employment in a voice switching control system in order to provide that system with a plurality of full-duplex non-blocking lines with general purpose summing capacities for the purpose of conferencing. The multi-line accumulator/multiplexer comprises the following basic elements: a sample data memory, a time slot memory, a summer, two accumulator memories, a digital-to-analog converter, a line map memory, a microprocessor, a slot control, and a alternate frame flip-flop.

10 Claims, 6 Drawing Figures

TIME SLOT MEMORY & LINE MAP MEMORY

MULTI-LINE ACCUMULATOR/MULTIPLEXER

DESCRIPTION

1. Technical Field

The present invention relates to a multi-line accumulator/multiplexer, and more specifically to an accumulator/multiplexer arrangement employed in a voice switching communications system in order to provide that system with a plurality of full-duplex non-blocking lines with general purpose summing capabilities for the purpose of conferencing.

2. Background Art

Digital voice communications systems are well-known in the prior art. In such systems, an audio signal is digitized and the resulting digital signal is provided to a digital audio bus. A plurality of subscriber stations is handled in accordance with well-known time division mutliplexing methods whereby each subscriber station transmits during a given time slot. Accordingly, point-to-point communication between two subscribers is established where the receiving subscriber selects data appearing on the digital audio bus during the time slot assigned to the sending subscriber, and converts the selected data to audio.

It is also well-known in the prior art to produce a conferencing capability whereby more than two subscribers communicate, on a "party line" basis, over the digital audio bus. Such a conferencing capability could, for example, be provided by an architecture in which summing is performed on a "shared" basis for several subscriber lines. However, this only provides a limited conferencing capability in that conferencing can be carried on but only within mutually exclusive subsets of lines. Obviously, such an arrangement has disadvantages in that only a limited number of different conferences can be conducted at the same time, and only one line can be involved in any one conference. Such limitations preclude the use of such an arrangement in certain applications, such as air traffic control systems.

In order to provide a conferencing capability, one could also employ an architecture in which summing is performed individually at the line (subscriber) level. Such a technique has the advantage of simplicity while providing for complete general-purpose conferencing. However, such a technique does have disadvantages, especially when employed in high-capacity systems.

Specifically, the use of line-level summers would require a digital audio bus which is physically available to all line-level cards in such a high-capacity system, and the length of the bus could become as much as twenty or thirty feet, presenting a propagation time which would consume a large percentage of the slot time. For example, presuming an audio sample frame period of 125 microseconds and a sampling rate of 8,000 times per second, 1,600 time slots would have to be provided every 125 microseconds, amounting to 78.125 nanoseconds per slot. Using five inches per nanosecond as the "worst case" propagation rate, a twenty foot bus length would result in a 48 nanosecond propagation delay or transit time. Other disadvantages of such a long-bus system include the necessity to design for minimum capacitance, reflection, and other factors.

As a result of the above considerations, it is clear that there is a need in the prior art for the development of digital voice communications architecture in which the bus is made "short", to the point where propagation time as a percentage of slot time becomes virtually insignificant. The employment of such a "short" bus also has the advantage of eliminating the other potential problems mentioned above.

The following patents are considered representative of the prior art: U.S. Pat. Nos. 3,978,290; 4,119,807; 4,190,742; 4,225,956; 4,229,814; 4,267,592; 4,289,932; 4,359,603; 4,432,089; and 4,477,897.

DISCLOSURE OF INVENTION

The present invention relates to a multi-line accumulator/multiplexer, and more specifically an accumulator/multiplexer for use in a voice switching communications system providing a plurality of full-duplex non-blocking lines with general-purpose summing capability for conferencing.

More specifically, the multi-line accumulator/multiplexer of the present invention has the capability of handling a given number of lines (for example, 64 lines). Accordingly, a given number of such accumulator/multiplexers (each accumulator/multiplexer defining a "card") can be inserted into a rack panel to make up a "fast bus subsystem" of a voice switching communications system. For example, a 1510-node voice switching communications system can be provided with a "fast bus" capability by the employment of a maximum of 32 (typically 28 in a maximum configuration, with four spare) of accumulator/multiplexer cards, each handling 64 lines, the plurality of cards being inserted into a 24-inch rack panel making up the "fast bus subsystem" of the voice switching communications system.

Each accumulator/multiplexer card inserted into the rack panel provides both digitized audio and controlled data interchange between the line-level cards and the digital audio bus, the latter being the central system interchange of digitized audio and control data between the accumulator/multiplexer cards.

An important feature of the present invention resides in the fact that, in contrast to the "shared summer" arrangements of the prior art, each accumulator/multiplexer in the voice switching communications system is provided with special circuitry for permitting a conference capability to be established between lines handled by different accumulator/multiplexer cards, that is, lines in different subsets of the "fast bus subsystem". This is particularly important capability when the provision of a general-purpose conferencing capability is required, such as in air traffic control systems.

As will be explained in more detail below, in accordance with the present invention, each accumulator/multiplexer is provided with a sample data memory in which sample data from each of the time slots occurring during a frame period are stored. Moreover, as a result of the employment in each accumulator/multiplexer of special-purpose memories (time slot memory and line map memory), indirect-addressing is performed so as to distribute summing operations over the frame period. Thus, summing operations are performed, one at a time, using time slots wherein there is no storing operation being performed.

Therefore, it is a primary object of the present invention to provide a multi-line accumulator/multiplexer for a voice switching communications system.

It is an additional object of the present invention to provide a multi-line accumulator/multiplexer having the capability of providing the voice switching communications system with a non-blocking characteristic and conferencing capability.

It is an additional object of the present invention to provide a multi-line accumulator/multiplexer wherein any of the plurality of lines connected thereto are capable of receiving from and summing any group of a larger plurality of lines connected to the voice switching communications system.

The above and other objects as will hereinafter appear, and the nature of the invention, will be more clearly understood by reference to the following detailed description, the appended claims, and the accompanying drawings.

BEST MODE FOR CARRYING OUT THE INVENTION

The invention will now be described in more detail, with reference to FIGS. 1 and 2, which are block diagrams of first and second portions, respectively, of the multi-line accumulator/multiplexer, and FIGS. 3A thru 3C which are timing diagrams and tables related to operation of the accumulator/multiplexer.

As previously mentioned, the multi-line accumulator/multiplexer of the present invention is capable of handling a plurality (preferably, 64) lines on a full-duplex, non-blocking basis. More specifically, the primary function of the accumulator/multiplexer is to receive and sum the digital audio for each line from the digital audio bus 70 (FIGS. 1 and 2) and to produce corresponding analog representations of the summations (AUDIO OUT) via a shared/multiplexed digital-to-analog converter (DAC) 32 (FIG. 1).

As also previously explained, the primary utility of the multi-line accumulator/multiplexer of the present invention is realized when a plurality (preferably, 28 or 32) of multi-line accumulator/multiplexers is employed in a voice switching communications system in support of a larger plurality (preferably, 1510) of lines or channels. The problem of receiving digital audio from the digital audio bus 70 for any of the associated 64 channels can be stated as follows: any of the 64 lines associated with a given multi-line accumulator/multiplexer must be able to receive from and sum any group of the 1510 slots worth of data appearing on the digital audio bus during a given frame period (125 microseconds).

It is to be understood that different lines may be summing sets of slots which are not mutually exclusive; that is, line 1 may require summation of digital audio from lines 256 and 910, while line 2 may require summation of digital audio from lines 124 and 910. A primary objective of the present invention is to accommodate this apparent conflict by making provision for two (or more) summations involving the same data (from line 910 in the latter example).

Figure 1:
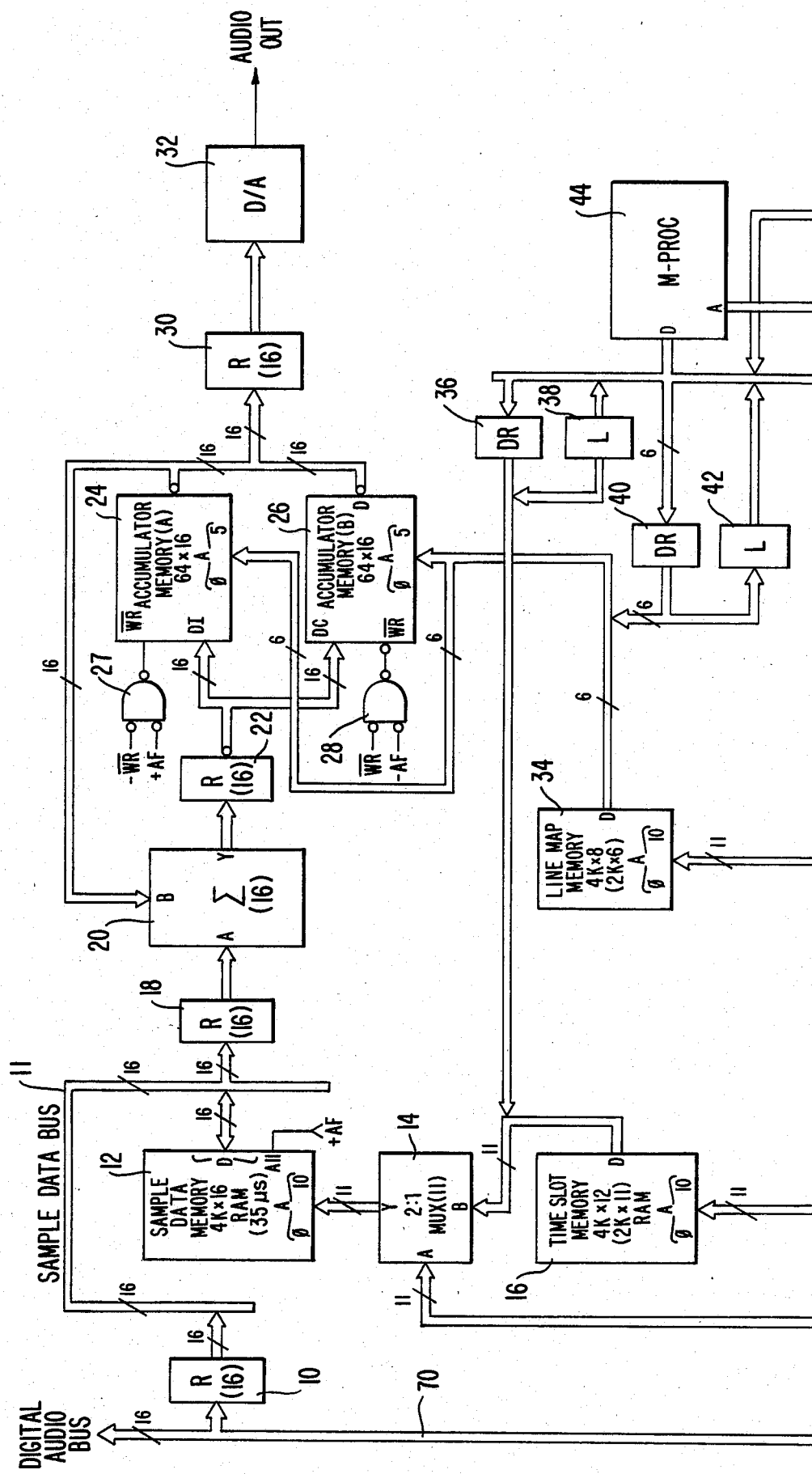
FIG. 1 is a block diagram of a first portion of the multi-line accumulator/multiplexer.
Figure 2:
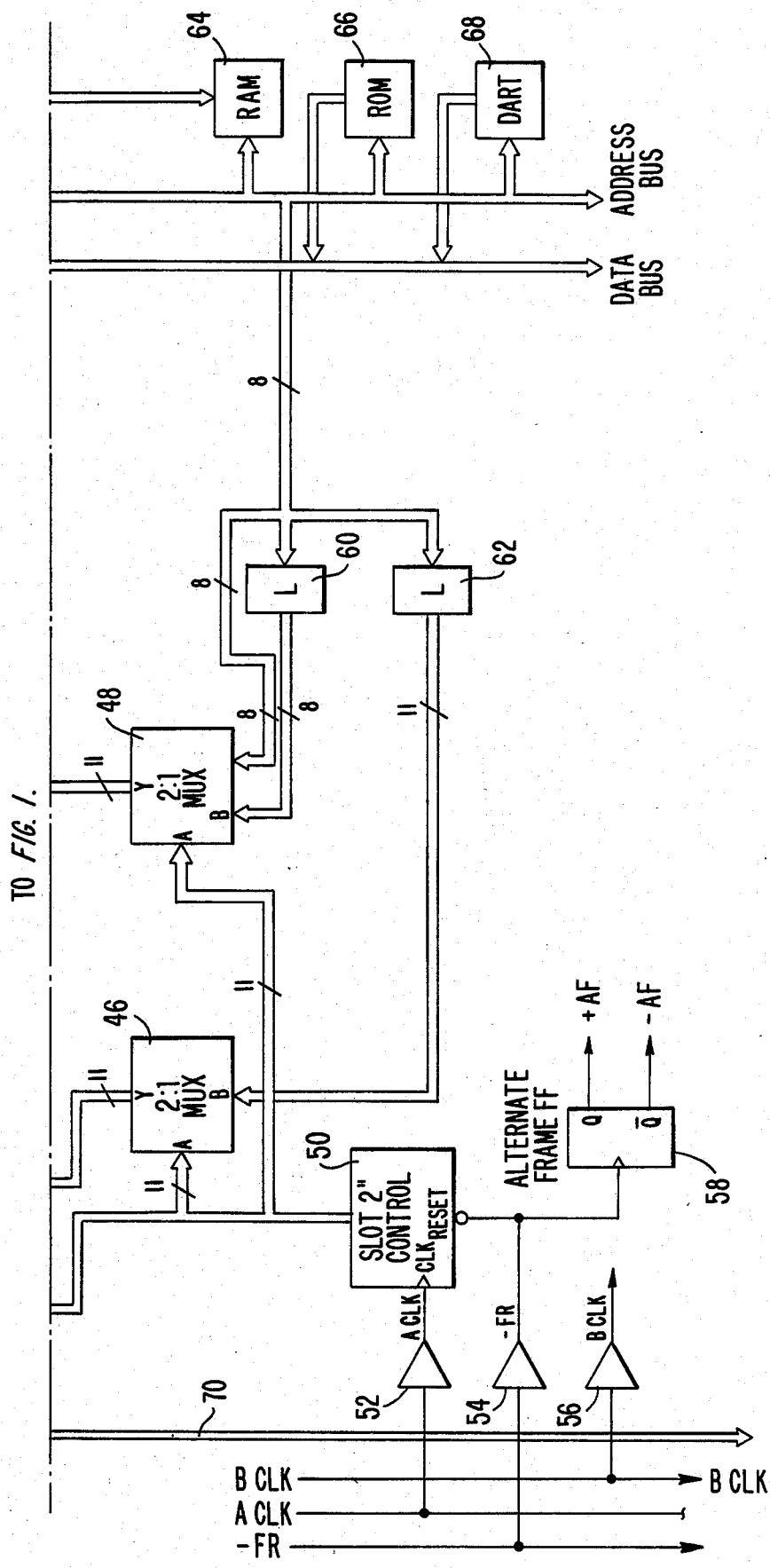
FIG. 2 is a block diagram of a second portion of the multi-line accumulator/multiplexer.

As seen in FIGS. 1 and 2, the multi-line accumulator/multiplexer of the present invention comprises the following major elements: sample data memory 12, time slot memory 16, summer 20, accumulator memories 24 and 26, DAC 32, line map memory 34, microprocessor 44, slot control 50 and alternate frame flip-flop 58.

Sample data memory 12 is a 4K memory divided into two portions of 2K each. Slot control 50 is a slot counter which is reset at the beginning of every frame by the frame signal —FR (provided via op amp 54), and counts in accordance with the slot sequence from 0 thru 1509 as clocked by the basic 78 nanosecond (13 MHz) clock signal, A CLK (output of op amp 52). See the timing diagram of FIG. 3A. The counter output of slot central 50 is provided, via multiplexer 14, to the address input of sample data memory 12. As a result, time-slotted digital audio data from the digital audio bus 70 is read sequentially into one-half of the sample data memory 12 via the register 10 and sample data bus 11 during a given frame period.

Whereas the storage of data from the digital audio bus 70 in sample data memory 12 is sequential by slot, the readout of data from the sample data memory data 12 is not sequential by slot, but is controlled by time slot memory 16. Specifically, slot control 50 provides its counter output, via multiplexer 46, to the address input of time slot memory 16, causing the data in time slot memory 16 to be read out in sequence and used to address sample data memory 12. Thus, the data in sample data memory 12 is indirectly addressed, and is read out, via register 18, to summer 20.

It should be noted that summing is not dependent on slot addresses, but rather on the address information stored in the time slot memory 16, which address information corresponds to the conference call setup. Such address information is loaded in time slot memory 16 only when there are changes in the call setup, and this data loading is done from microprocessor 44 via driver 36. Between changes in conference call setups, all real-time processes are controlled strictly by hardware.

It should also be noted that the address information is loaded into those storage locations in time slot memory 16 corresponding to time slots during which summing operations may be carried out without interference (such as by data storage).

Each multi-line accumulator/multiplexer contains a high-speed digital summer 20. As each 78-nanosecond slot passes, the summer 20 retrieves the accumulated value (accumulated thus far) for a particular one of the 64 lines from the accumulator memory 24 (via input B to the summer 20), adds the new value provided by sample data memory 12 via register 18 to input A of summer 20, and writes the summation result back into accumulator memory 24 via register 22. This process of reading data from sample data memory 12 and accumulator 24, summing the data, and storing the results back into accumulator memory 24 is accomplished during a first half of each slot time of 78 nanoseconds.

"Pipelining" of data is achieved under the control of alternate frame flip-flop 58. Specifically, during one frame (125 microseconds), a first 2K portion of sample data memory 12 is receiving digital audio data from the bus 70 via register 10, while a second 2K portion of sample data memory 12 is being accessed by the summer 20 for the purpose of summation processing of the data stored in memory 12 during the previous frame. At the end of a frame, the two portions of the sample data memory 12 switch functions so that the newly stored data can be processed while the next set of data is being stored in memory 12 (see tables of FIG. 3B). This switching of functions of portions of the memory 12 is controlled by the outputs +AF and −AF of alternate frame flip-flop 58.

The same type of switching of functions takes place with respect to accumulator memories 24 and 26 under the control of outputs +AF and −AF of alternate frame flip-flop 58, provided to accumulator memories 24 and 26 via NAND gates 27 and 28, respectively. Thus, during one frame, accumulator memory 24 may be receiving data from the summer 20 via register 22, while accumulator memory 26 is providing previously stored data to the DAC 32 via register 30 for the purpose of audio output. At the end of the given frame, the accumulator memories 24 and 26 switch functions.

Typically, 64 predesignated slots, evenly distributed throughout a frame, are dedicated to "accumulator memory readout" (thus, 64 summations/conferences can be handled), while the balance of the slots in a frame can be used for summing. The readout of each storage location of the accumulator memory 24 or 26 to the DAC 32 is preferably a "destructive readout" so that each memory is cleared at the end of its "readout" frame.

Accumulator memories 24 and 26 are indirectly addressed in a manner similar to the way in which sample data memory 12 is indirectly addressed. Specifically, a slot control 50 sequences the 1510 slots, providing its counter output as an address input to line map memory 34, the contents of which are a selection (one out of 64) of the line whose accumulator memory location will be addressed for summing, via summer 20, with appropriate data from the sample data memory 12 during the time slot dictated by the address in line map memory 34.

The line map memory 34, in a manner similar to the time slot memory 16, is only loaded with data when there are changes in the conference call setup. This loading is done from the microprocessor 44 via driver 40 during the second half of each time slot. Between changes in call setups, all real-time processes are controlled by hardware.

Figure 3A:
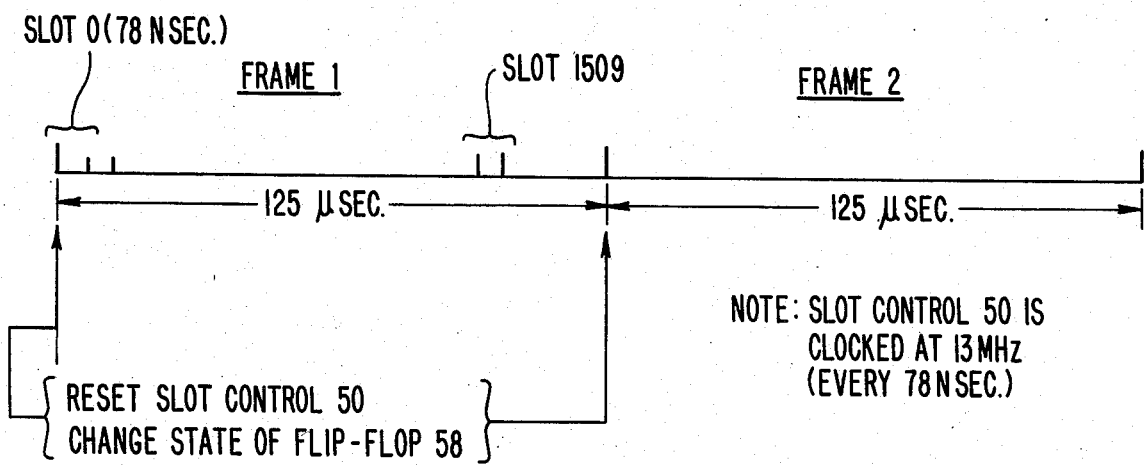
FIGS. 3A thru 3C are timing diagrams and tables associated with the operation of the multi-line accumulator/multiplexer.
Figure 3B:
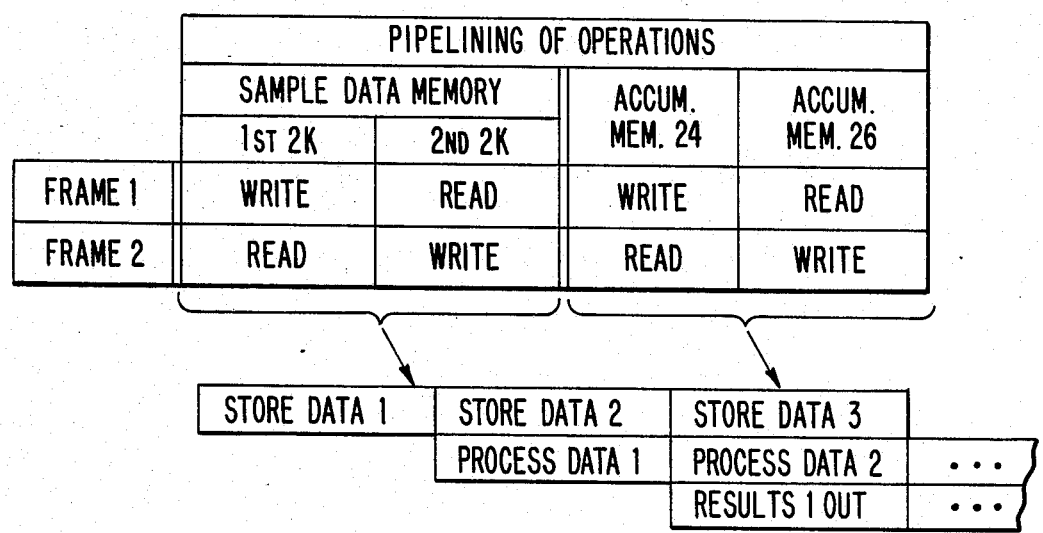
Figure 3C:
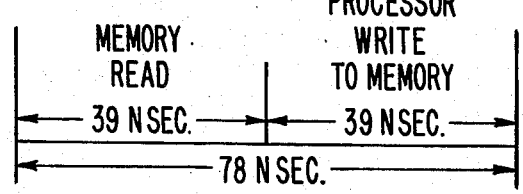

FIGS. 3A thru 3C are timing diagrams and tables relating to the operation of the multi-line accumulator/multiplexer of the present invention. As seen in FIG. 3A, each frame of 125 microseconds is divided into 1510 slots (slots 0 thru 1509), each slot being approximately 78 nanoseconds in duration. As also indicated in FIG. 3A, at the beginning of each frame (thus, at the beginning of slot 0), the slot control 50 of FIG. 2 is reset and alternate frame flip-flop 58 of FIG. 2 generates either a +AF or −AF output.

In addition, as indicated in FIG. 3B, during a first frame, data from the digital audio bus is written into the first 2K portion of sample data memory 12, data previously stored in memory 12 is read from the second 2K portion thereof and provided to the summer 20, data from one of the accumulator memories (e.g., accumulator memory 24) is provided as a further input to the summer 20, the summation results are written into accumulator memory 24, and data previously accumulated (e.g., in accumulator memory 26) is read via register 30 to the DAC 32 to produce the audio output of the accumulator/multiplexer. Of course, as indicated in FIG. 3B, the aforementioned roles or functions are switched during a second frame period.

Finally, as indicated in FIG. 3C, in order to achieve "memory mapping" of time slot memory 16 and line map memory 34 without access collisions, each time slot of approximately 78 nanoseconds is divided into two halves: the first half is dedicated to read-out of data for the real-time processes (i.e., readout of address data from time slot memory 16 and line map memory 34); the second half is reserved for alteration of control data by the micro-processor 44 (i.e., change of address data stored in time slot memory 16 and/or line map memory 34). Thus, the real-time summing process and the conference call setup process are transparent to each other.

Figure 4:
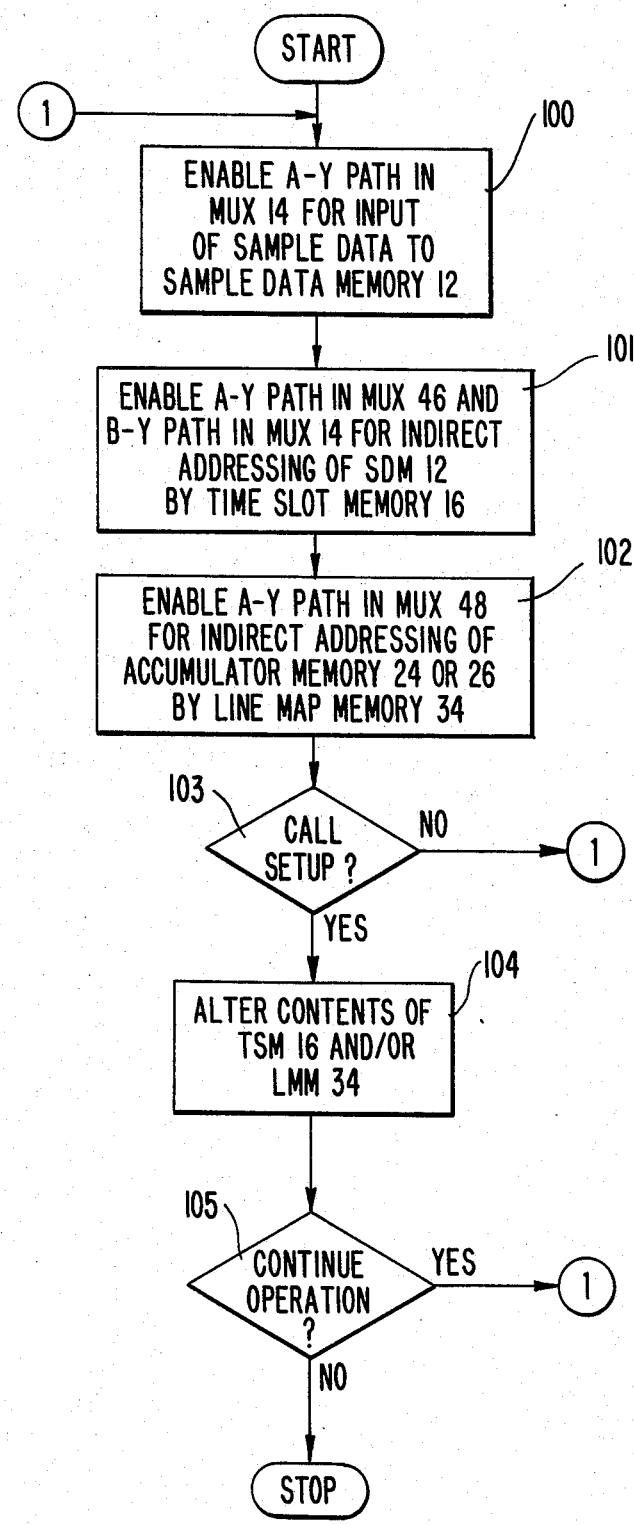
FIG. 4 is a flowchart of the operations performed by the microprocessor of FIG. 1.

FIG. 4 is a flowchart of the software operations performed by microprocessor 44. Blocks 100 thru 102 of the flowchart describe control operations carried out by microprocessor 44 with respect to multiplexers 14, 46 and 48 during the first half of each time slot to enable sample data storage and summing operations to be carried out. Blocks 103 thru 105 of the flowchart describe control operations carried out by microprocessor 44 with respect to time slot memory 16 and/or line map memory 34 during the second half of each time slot to enable the contents of these memories to be established or altered to initiate or change the conferencing setup.

Referring back to FIGS. 1 and 2, it should be noted that microprocessor 44 has associated with it a conventional random-access memory (RAM) 64, a conventional read-only memory (ROM) 66, and a conventional dual asynchronous receiver-transmitter (DART) 68. The latter three devices are accessed by the microprocessor 44 via the address bus shown in FIGS. 1 and 2 while data is written to and read from the RAM 64 via the data bus shown, and data is read from the ROM 66 and DART 68 via the data bus shown.

The advantages of the above-described invention can be summarized as follows. The principal advantage of the present invention resides in the fact that, by employing a plurality of multi-line accumulator/multiplexers, each capable of handling a plurality of lines, a much larger plurality of lines can be handled, while still providing each subscriber line with the capability of being conferenced with any other line, even with lines outside of the particular subset of lines being handled by its particular accumulator/multiplexer. Moreover, the latter advantage is achieved without any sacrifices in terms of excessively large physical space requirements or excessively inefficient propagation times.

It is to be understood that, in the above-described embodiment, digital data is carried throughout the system in linear format. However, the digital data could be carried in non-linear format so long as the digital data is converted to linear format before summation takes place.

While preferred forms and arrangements have been shown in illustrating the invention, it is to be understood that various modifications can be made without departing from the spirit and scope of this disclosure.

I claim:

1. A circuit for receiving a plurality of data distributed sequentially in time throughout a corresponding sequence of time slots within a frame, and for processing at least said plurality of data during a plurality of time slots in a subsequent frame, each datum of said plurality of data being received by said circuit during a respective assigned time slot within said sequence of time slots, said circuit comprising:

sample data memory means having sequential storage locations, at least one for each datum, for storing said plurality of data received by said circuit, each datum being stored in a sequential storage location in correspondence to the sequence in which it was received;

time slot memory means having storage locations, one for each time slot in said subsequent frame, for storing control information identifying each datum of said plurality of data to be processed during each respective time slot in said subsequent frame; and control means connected to said sample data memory means and producing control outputs for enabling said sample data memory means to store said each datum as it is received during and in accordance with its respective assigned time slot, said control means being connected to said time slot memory means so as to provide said control outputs thereto;

said time slot memory means being responsive to said control outputs for sequentially reading out to said sample data memory means, during each respective time slot, said control information identifying said each datum to be processed during said each respective time slot;

said sample data memory means being responsive to said control information for reading out, during said each respective time slot, said each datum to be processed during said each respective time slot;

said circuit further comprising accumulator means for accumulating, during said each respective time slot, said each datum read out from said sample data memory means during said each respective time slot of said frame with those data read out from sample data memory means during corresponding time slots of previous frames.

2. The circuit of claim 1, wherein said sample data memory means comprises two memory portions, each memory portion having a number of storage locations equal to the plurality of data received by said circuit within said frame, said circuit further comprising flip-flop means for controlling said two memory portions to alternate their roles, whereby one of said two memory portions receives said plurality of data while the other provides said plurality of data to said processor means during a given frame, and said two memory portions reverse roles during said subsequent frame.

3. A voice switching communications system comprising a plurality of circuits as recited in claim 1, said system further comprising bus means for interconnecting said plurality of circuits, whereby to provide a nonblocking voice switching communications system in which each subscriber has unlimited conferencing capability relative to any other subscriber.

4. A circuit for receiving a plurality of data distributed in time throughout a corresponding plurality of time slots within a frame, and for processing at least said plurality of data during a plurality of time slots in a subsequent frame, each datum of said plurality of data being received by said circuit during a respective assigned time slot within said plurality of time slots, said circuit comprising:

sample data memory means having storage locations, at least one for each datum, for storing said plurality of data received by said circuit;

time slot memory means having storage locations one for each time slot in said subsequent frame, for storing control information identifying each datum of said plurality of data to be processed during a respective time slot within said plurality of time slots; and control means connected to said sample data memory means and producing control outputs for enabling said sample data memory means to store said each datum as it is received during its respective assigned time slot, said control means being connected to said time slot memory means so as to provide said control outputs thereto;

said time slot memory means being responsive to said control outputs for sequentially reading out to said sample data memory means, during each respective time slot, said control information identifying said each datum to be processed during said each respective time slot;

said sample data memory means being responsive to said control information for reading out, during said each respective time slot, said each datum to be processed during said each respective time slot;

said circuit further comprising processor means for processing, during said each respective time slot, said each datum read out from said sample data memory means;

wherein said processing means comprises a summer having first and second inputs and an output, said first input of said summer being connected to said sample data memory means for receiving, during said each respective time slot, said each datum read out from said sample data memory means, said processing means further comprising at least one accumulator memory having an input connected to the output of said summer and an output connected to the second input of said summer, said at least one accumulator memory providing to said summer, during said each respective time slot of a given frame, a prior summation output of said summer stored in said at least one accumulator memory during a frame prior to said given frame, said summer providing to said at least one accumulator memory, during said each respective time slot, a new summation output obtained by adding said each datum read out from said sample data memory means to said prior summation output.

5. The circuit of claim 2, further comprising converting means connected to said output of said at least one accumulator memory for receiving, during said each respective time slot of said given frame, said prior summation output stored in said at least one accumulator memory during a frame prior to said given frame, and for converting said prior summation output to audio.

6. The circuit of claim 3, wherein said at least one accumulator memory comprises two accumulator memories, said circuit further comprising flip-flop means for controlling said two accumulator memories to alternate their roles whereby, during said each respective time slot of said given frame, one of said two accumulator memories provides said prior summation output stored therein to said summer and receives said new summation output from said summer while the other of said two accumulator memories provides said prior summation output stored therein to said converting means.

7. The circuit of claim 3, further comprising line map memory means having storage locations, one for each time slot in said given frame, for storing further control information identifying each said prior summation output stored in said at least one accumulator memory during a respective time slot in said frame prior to said given frame and to be provided to said converting means during said respective time slot of said given frame.

8. The circuit of claim 5, said line map memory means being connected to said control means and responsive to said control outputs therefrom for sequentially reading out, to said at least one accumulator memory during said each respective time slot, said control information identifying each said prior summation output stored in said at least one accumulator memory during said each respective time slot in said frame prior to said given frame and to be provided to said converting means during said each respecting time slot of said given frame.

9. The circuit of claim 2, further comprising line map memory means having storage locations, one for each time slot in said given frame, for storing further control information identifying each said prior summation output stored in said at least one accumulator memory during a respective time slot in said frame prior to said given frame and to be provided to said summer during said respective time slot of said given frame.

10. The circuit of claim 7, said line map memory means being connected to said control means and responsive to said control outputs therefrom for sequentially reading out to said at least one accumulator memory, during said each respective time slot, said further control information identifying each said prior summation output stored in said at least one accumulator memory during said each respective time slot in said frame prior to said given frame and to be provided to said summer during said each respective time slot of said given frame.

* * * * *